United States Patent [19]

Saito et al.

[11] Patent Number: 4,462,919

[45] Date of Patent: Jul. 31, 1984

[54] FERROMAGNETIC RESIN COMPOSITION CONTAINING POLYMERIC SURFACE PRECOATED MAGNETIC RARE EARTH COBALT POWDERS

[75] Inventors: Takehide Saito, Osaka; Yasuo Nakagawa, Nishinomiya, both of Japan

[73] Assignee: Sumitomo Bakelite Company, Limited, Tokyo, Japan

[21] Appl. No.: 560,062

[22] Filed: Dec. 9, 1983

Related U.S. Application Data

[63] Continuation-in-part of Ser. No. 480,976, Mar. 31, 1983, abandoned.

[30] Foreign Application Priority Data

Apr. 2, 1982 [JP] Japan .............................. 57-53745

[51] Int. Cl.[3] .......................... H01F 1/04; H01F 1/26; H01F 1/37; C08K 3/08

[52] U.S. Cl. .............................. 252/62.54; 428/327; 428/400; 428/407; 523/201; 523/202; 523/205; 523/210; 524/401; 524/403; 524/435

[58] Field of Search ...................... 428/327, 400, 407; 252/62.54; 523/201, 202, 205, 210; 524/401, 403, 405, 435; 264/DIG. 58

[56] References Cited

U.S. PATENT DOCUMENTS

| | | | |
|---|---|---|---|
| 3,185,589 | 5/1965 | Damm | 252/62.54 |
| 3,228,881 | 1/1966 | Thomas | 523/205 |
| 3,228,882 | 1/1966 | Thomas | 428/900 |
| 3,330,693 | 7/1967 | Rumberger | 428/900 |
| 3,427,191 | 2/1969 | Howell et al. | 428/327 |
| 3,519,594 | 7/1970 | Michaels | 523/205 |
| 3,668,176 | 6/1972 | Childress | 252/62.54 |
| 3,677,947 | 7/1972 | Ray et al. | 252/62.54 |
| 3,691,130 | 9/1972 | Logvinenko | 523/205 |
| 4,022,701 | 5/1977 | Sawa et al. | 252/62.54 |
| 4,115,338 | 9/1978 | Kobayashi et al. | 523/205 |

FOREIGN PATENT DOCUMENTS

| | | | |
|---|---|---|---|
| 54-13993 | 2/1979 | Japan | 252/62.54 |
| 55-11339 | 1/1980 | Japan | 252/62.54 |
| 56-147856 | 11/1981 | Japan | 252/62.54 |

OTHER PUBLICATIONS

Derwent Abst. 26925U/19, DT2249776, (4-1973).
Derwent Abst. 35346V/19, J49009697, (1-1974).
Derwent Abst. 69717Y/39, J52098531, (8-1977).

*Primary Examiner*—Herbert J. Lilling
*Attorney, Agent, or Firm*—Karl W. Flocks; Sheridan Neimark

[57] ABSTRACT

A ferromagnetic resin composition obtained by filling a thermoplastic resin with 70 to 97% by weight of rare earth-cobalt powder, the surface of which has been coated with a thermosetting resin or a thermoplastic resin. The composition gives a plastic magnet excellent in impact resistance.

18 Claims, 2 Drawing Figures

FERROMAGNETIC RESIN COMPOSITION CONTAINING POLYMERIC SURFACE PRECOATED MAGNETIC RARE EARTH COBALT POWDERS

CROSS-REFERENCES TO RELATED APPLICATION

This is a continuation-in-part of application Ser. No. 480,976 filed on Mar. 31, 1983 and now abandoned.

BACKGROUND OF THE INVENTION

1. Field of the Invention

This invention relates to a ferromagnetic resin composition obtained by subjecting rare earth-cobalt powder, which is a ferromagnetic powder, to oxidation-inhibiting treatment, and then filling a thermosetting resin with said powder in an amount of 70 to 97% by weight.

2. Description of the Prior Art

With the development of electronic and electric industries, the performance characteristics of magnets have been improved, and the use thereof has greatly been broadened and the amounts thereof have greatly been increased. Magnets which are most general and much used are sintered ferrite magnets produced by a powder metallurgy method. Their characteristics, when expressed in terms of maximum energy product $(BH)_{max}$, are approximately 1 MGOe in the case of isotropic magnets and 2 to 4 MGOe in the case of anisotropic magnets, and sintered ferrite magnets are markedly characterized in that they are very inexpresive as compared with other magnets. In addition, Alnico magnets are often used, and show such excellent characteristics as compared with ferrite magnets that their maximum energy products are 5 to 8 MGOe. However, they are disadvantageous in that they are expensive owing to the sudden rise in prices of raw material cobalt, tend to lose magnetic force because of a small coercive force Hc, and hence, the use thereof is limited. Further, recently, rare earth-cobalt magnets have come to be noticed in various fields because they have excellent magnetic characteristics. Although rare earth-cobalt magnets themselves are considerably expensive because rare earth elements per se and cobalt are both expensive, they are fairly often used in smallsized parts in which they can effectively exhibit their excellent characteristics.

The magnets described above are disadvantageous in that they are low in impact resistance and tend to crack because they are produced by casting or sintering. In recent years, there have been developed and widely used plastic magnets obtained by filling plastics with ferrite powder in order to improve the impact resistance. These magnets have a lower magnetic force than sintered magnets because they contatin a large amount of a plastic material which is a substance irrelevant to magnetism. In order to supply this deficiency, it has been tried to improve a technique for conversion to anisotropic by which the easy axes of magnetization of ferrite powder are aligned in one direction, and it has become possible to enhance the $(BH)_{max}$ values of plastic magnets to 1.7 MGOe which is higher than those of isotropic sintered ferrite magnets. However, most of magnets having a $(BH)_{max}$ of 2.0 MGOe or higher are anisotropic sintered ferrite magnets, Alnico magnets or rare earth magnets, which are brittle and hence said to be not usable in a considerable number of fields. In recent years, there have been invented plastic magnets obtained by impregnating rare earth-cobalt powder with epoxy resin powder, as magnets which can have a $(BH)_{max}$ in the range described above and possess improved impact resistance. However, they are not yet sufficient in impact resistance and are disadvantageous also in that they cannot be recycled at all and hence become expensive after all.

SUMMARY OF THE INVENTION

In order to produce a ferromagnetic resin composition, which has a further improved impact resistance and whose magnetic force covers all the ranges from the range of magnetic force of sintered ferrite magnets to that of Alnico magnets and rare earth-cobalt magnets, by filling a thermoplastic resin capable of being recycled with 70 to 97% by weight of rare earth-cobalt powder, we have conducted research to accomplish this invention.

This invention relates to a resin magnet capable of generating a magnetic force in terms of $(BH)_{max}$ of 2.0 to 15 MGOe which is obtained by coating the surface of rare earth-cobalt powder with a resin in order to prevent its oxidative deterioration, filling a thermoplastic resin with the rare earth-cobalt powder in an amount of 70 to 97% by weight, and then subjecting the thermoplastic resin to injection molding in a magnetic field.

DETAILED DESCRIPTION OF THE INVENTION

The particle size of the rare earth element to be used is 2 to 10μ, preferably 5 to 8μ. When it is less than 2μ, the resulting composition is greatly inferior in ability as ferromagnetic substance because the domain is broken. When it is more than 10μ, the magnetic force decreases because the degree of orientation becomes low.

The rare earth-cobalt powder includes A-$Co_5$ and $A_2$-$Co_{17}$, wherein A is a rare earth element showing crystal magnetic anisotropy which includes yttrium (Y), cerium (Ce), praseodymium (Pr), neodymium (Nd), samarium (Sm), gadolinium (Gd), misch metal (M-M) which is a mixture of various rare earth metals, etc. In kneading rare earth-cobalt powder together with a resin, the most caseful attention must be directed to oxidative deterioration due to water and adsorption of oxygen. Particularly at the time of kneading and molding, heat and pressure applied are intense, so that oxidative deterioration tends to take place. Further, the starting materials often come in contact with oxygen in the production process, and hence, are liable to be deteriorated before the formation of a molded article. Therefore, an ingot after heat treatment is subjected to wet grinding by using an organic solvent and at the same time, the surface of rare earth element powder is coated with a thermosetting resin having an oxygen- and water-barrier property or a thermoplasic resin which has previously dissolved therein in an amount of 0.1 to 5% by weight, preferably 0.5 to 2% by weight. As the resin used for the coating, there are thermosetting resins such as phenolic resins, eopxy resins, urea resins, melamine resins, unsaturated polyesters, alkyd resins, urethane resins, and the like. Although these resins may finally be cured, prepolymers thereof may as such be used in the uncured state. As the thermoplastic resins, there may be used, for example, olefinic resins such as polyethylenes, polypropylenes, EVA, ionomers, polybutenes, olefinic copolymers and the like and polyamide resins. In coating the powder with any of these resins, the use of the resin in an amount of 0.5% by weight or less does not make it possible to prevent oxygen from being adsorbed on the powder. When the amount exceeds 2% by weight, it is so large that the magnetic force is lowered.

Figure 1:
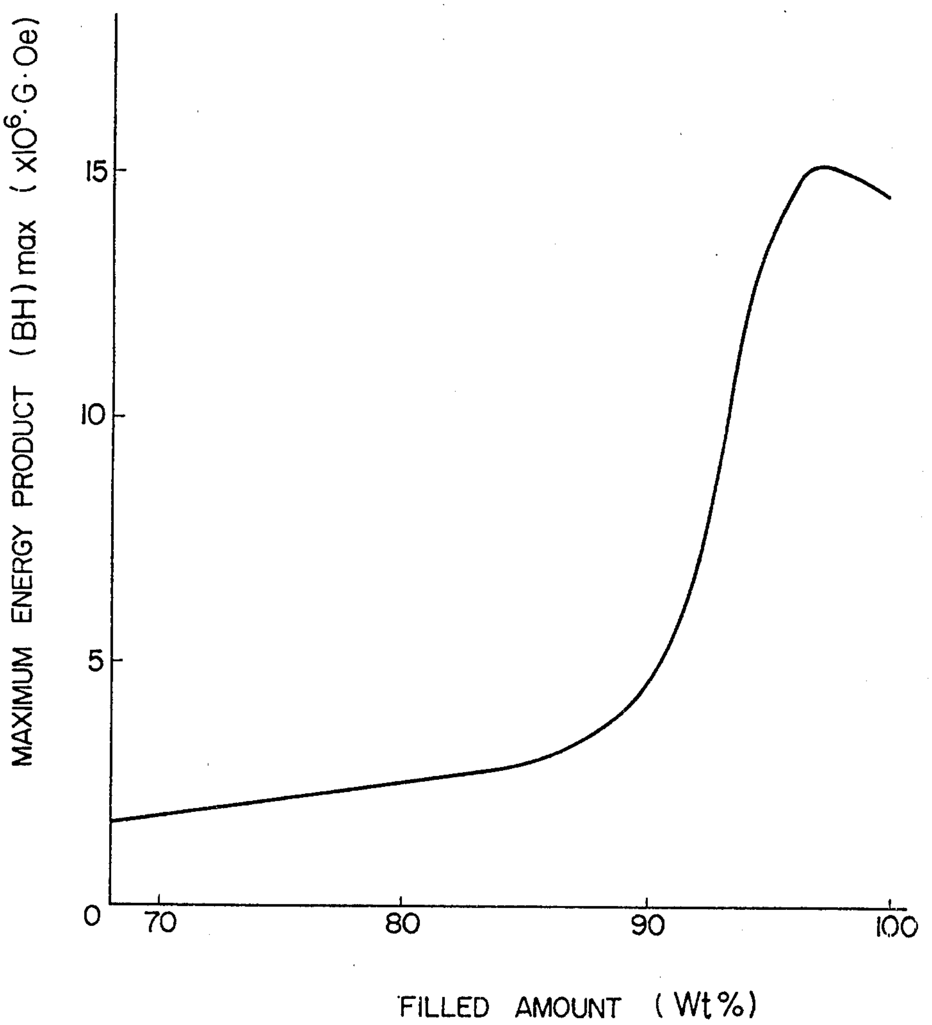
FIG. 1 is a graph showing the relationship between the amount of 1–5 type samarium cobalt powder filled into PP and the maximum energy product of each molded article obtained therefrom.

Subsequently, a thermoplastic resin is filled with the coated rare earth-cobalt powder in an amount of 70 to 97% by weight. As the resin, there may be used olefinic resins such as polyethylenes, polypropylenes and the like, polyamide resins such as nylon-6, 12, 6—6 and the like, polycarbonate resins, modified PPO, polyacetals, PBT, polyacrylate resins, engineering plastics such as PPS, PS, PES and the like, etc. The magnetic force can be adjusted by properly selecting the mixing ratio between these resins and the treated rare earth-cobalt powder. As one example, there is shown in FIG. 1 the maximum energy product $(BH)_{max}$ of a molded article obtained by filling, as the 1–5 type powder, 1–5 type samarium-cobalt powder into polypropylene, and subjecting the polypropylene to injection molding in a magnetic field. As can be seen from FIG. 1, the magnetic force increases suddenly from a filled amount of about 90% by weight and reaches a saturation point at a filled amount of 97% by weight. If the filled amount is more than 97% by weight, the magnetic force decreases on the contrary. The reason for this is that when a large amount of rare earth element powder is filled, the resulting composition has a lowered fluidity and a lowered degree of orientation. When the physical properties of a composition obtained by kneading the rare earth element powder subjected to the above-mentioned treatment are measured, the composition has an improved strength as compared with sintered product, but the strength as a resin composition is in a low range. This is because the bonding strength between the rare earth element powder and the resin is insufficient. In order to supply this deficiency, a surface-treating agent is added in an amount of 0.1 to 2% by weight based on the weight of the rare earth element powder. The surface-treating agent to be added includes organosilanes such as epoxy silanes, amino silanes, vinyl silanes, chloro silanes, and the like, and is selected depending upon the resin used.

DESCRIPTION OF PREFERRED EMBODIMENTS

Example 1

Into 300 g of toluene having dissolved therein 3 g of an epoxy resin (EPB-27 manufactured by Nihon Soda Co., Ltd.) was poured 300 g of 1–5 type samarium-cobalt powder, and the resulting mixture was subjected to stirring to coat the powder with the resin, after which the coated powder was dried under reduced pressure to obtain an epoxy resin-coated 1–5 type samarium-cobalt powder. Ten grams of each of this powder and untreated 1–5 type samarium cobalt powder as a comparative example was allowed to stand in air, and the change with lapse of time of the amount of oxygen adsorbed was measured for each powder to obtain the results shown in Table 1.

TABLE 1

| (Amount of oxygen adsorbed (PPM)) | | | | | |
|---|---|---|---|---|---|
| Standing period (day) | 1 | 3 | 7 | 14 | 28 |
| Untreated powder (PPM) | 30 | 60 | 83 | 88 | 90 |
| Coated powder (PPM) | 10 | 15 | 20 | 21 | 22 |

It can be seen that as is evident from Table 1, the coated powder of this invention is difficult to oxidize as compared with the untreated powder.

The magnetic forces of molded articles obtained from a composition prepared by filling nylon-12 with 95% by weight of each of the powders after allowing the powder to stand in air for 28 days, were measured to find that in the untreated powder case, $BH_{max}$ was 3 MGOe and in the case of the powder of this invention, $BH_{max}$ was 9 MGOe.

Example 2

Into 300 g of toluene having dissolved therein 0.3, 1.5, 3, 6 or 9 g of a nylon copolymer was poured 300 g of 2–17 type samarium-cobalt powder, after which the resulting mixture was subjected to stirring to coat the powder with the resin. The thus coated powder was then dried under reduced pressure to obtain nylon-coated 2–17 type samarium-cobalt powder. The powders thus obtained were allowed to stand in air, and the change with lapse of time of the amount of oxygen adsorbed was measured for each powder to obtain the results shown in Table 2.

TABLE 2

| (Amount of oxygen adsorbed (PPM)) | | | | | |
|---|---|---|---|---|---|
| Standing period (day) | 1 | 3 | 7 | 14 | 28 |
| 0.1% coated powder | 30 | 48 | 59 | 65 | 70 |
| 0.5% coated powder | 12 | 18 | 21 | 25 | 28 |
| 1% coated powder | 10 | 14 | 16 | 20 | 24 |
| 2% coated powder | 8 | 15 | 17 | 19 | 19 |
| 3% coated powder | 7 | 14 | 17 | 19 | 20 |

It can be seen that as shown in Table 2, considerable adsorption of oxygen was observed in the case of the 0.1% coated powder, and that the amount of oxygen adsorbed becomes smaller in the case of 0.5% or more coated powders, but substantially no difference is observed in the case of the 2% or more coated powders.

Figure 2:
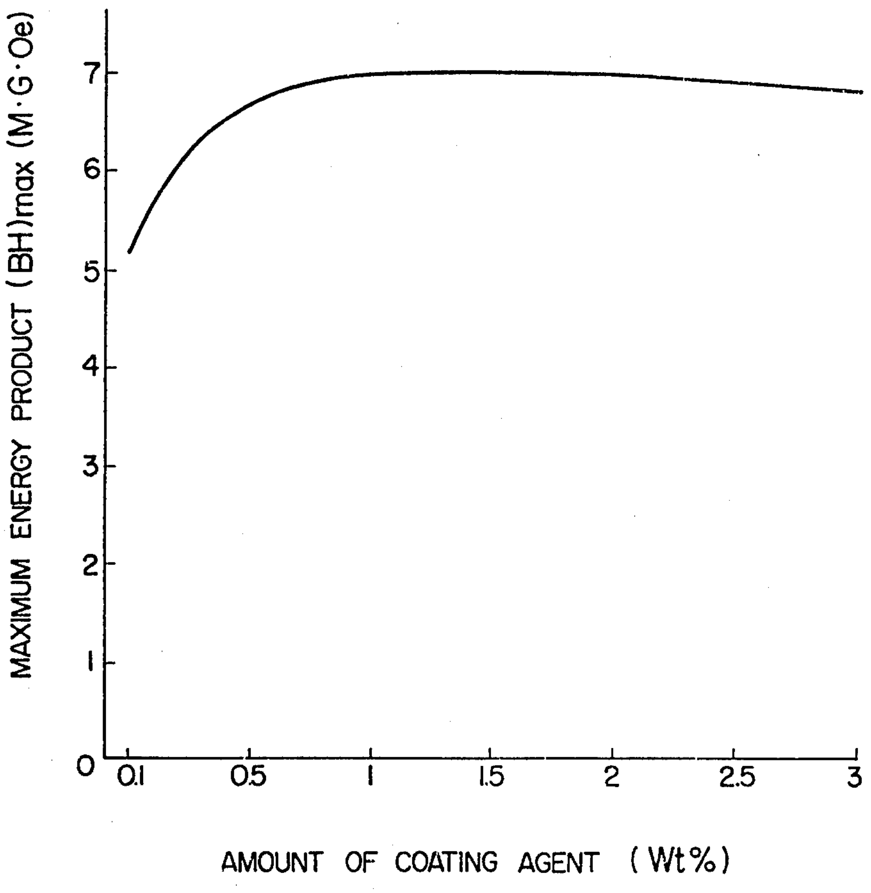
FIG. 2 is a graph showing the relationship between the maximum energy product and the concentration of a coating agent.

Subsequently, the results of measuring the magnetic forces of molded articles obtained from a composition prepared by filling nylon-12 with 93% by weight of each of the powders allowed to stand in air for 28 days are shown in FIG. 2. It can be seen that as shown in FIG. 2, the magnetic force was lowered considerably in the case of the 0.1% coated powder. In the case of the 3% coated powder, the magnetic force showed a tendency to lower slightly owing to an increase of the total amount of the resins.

Example 3

Into 940 g of toluene having dissolved therein 9.4 g of an epoxy resin (EBT-27 manufactured by Nihon Soda Co., Ltd.) was poured 940 g of 1–5 type samarium-cobalt powder, after which the resulting mixture was subjected to stirring to coat the powder with the resin. The thus coated powder was then dried under reduced pressure to obtain an epoxy resin-coated 1–5 type samarium-cobalt powder. The powder was divided into two parts, and one part was kneaded together with 30 g of nylon-12 (P3014B of Ube Kosan Co., Ltd.), while the other part was kneaded together with 30 g of nylon-12 (P3014B of Ube Kosan Co., Ltd.) and 2.35 g of an aminosilane (A-1160 manufactured by Nihon Unica Co., Ltd.), and the physical properties of the thus obtained compositions were measured. The results obtained are shown in Table 3, in which the former composition is represented by the symbol "A" and the latter composition by the symbol "B".

TABLE 3

| Test item | Test method | Unit | A | B |
|---|---|---|---|---|
| Specific gravity | ASTM-D-792 | | 5.56 | 5.56 |
| Rockwell hardness (R scale) | ASTM-D-785 | | 105 | 110 |
| Tensile strength | ASTM-D-638 | $kg/cm^2$ | 230 | 450 |
| Izod impact strength | ASTM-D-256 | $kg\text{-}cm/cm^2$ | 4.4 | 4.8 |
| Flexural strength | ASTM-D-790 | $kg/cm^2$ | 380 | 540 |
| Flexural elastic modulus | ASTM-D-790 | $kg/cm^2$ | $1.1 \times 10^5$ | $1.3 \times 10^5$ |
| Heat-deformation temperature | ASTM-D-648 | °C. | 135 | 138 |
| Residual magnetic flux density (Br) | JIS-K-2501 | G | 6350 | 6330 |
| Coercive force (Hc) | " | Oe | 5100 | 5110 |
| Maximum energy product $(BH)_{max}$ | " | $\times 10^6$G.Oe | 8.8 | 8.8 |

As can be seen from Table 3, the composition B containing the aminosilane had an improved strength as compared with the composition A which did not have it. Further, it was confirmed that no lowering of the magnetic force was caused by the addition of the aminosilane.

We claim:

1. A ferromagnetic resin composition consisting essentially of a thermoplastic resin filled with 70 to 97% by weight of magnetic rare earth-cobalt powder haing a particle size of 2 to 10μ, the surface of which has been pre-coated with 0.1 to 5% by weight of a thermosetting resin or a thermoplastic resin.

2. A ferromagnetic resin composition according to claim 1, wherein the resin for the coating is a thermosetting resin selected from the group consisting of phenolic resins, epoxy resins, urea resins, melamine resins and urethane resins, or a thermoplastic resin selected from the group consisting of polyethylene, polypropylene, ethylene-vinyl acetate copolymer, ionomers, polybutene and polyamide resins.

3. A ferromagnetic resin composition according to claim 1, wherein the thermoplastic resin filled with the coated powder is selected from the group consisting of olefinic resins, polyamide resins, polycarbonate resins, modified PPO, polyacetals, PBT, polyacrylate resins, PPS, PS and PES.

4. A ferromagnetic resin composition according to claim 2, wherein the termoplastic resin filled with the coated powder is selected from the group consisting of olefinic resins, polyamide resins, polycarbonate resins, modified PPO, polyacetals, PBT, polyacrylate resins, PPS, PS and PES.

5. A ferromagnetic resin composition according to claim 1, wherein the rare earth-cobalt powder is of $A\text{-}Co_5$ or $A_2\text{-}Co_{17}$, wherein A is a rare earth element showing crystal magnetic anisotropy selected from the group consisting of yttrium, cerium, praseodymium, neodymium, samarium, gadolinium and misch metal which is a mixture of various rare earth metals.

6. A ferromagnetic resin composition according to claim 2, wherein the rare earth-cobalt powder is of $A\text{-}Co_5$ or $A_2\text{-}Co_{17}$, wherein A is a rare earth element showing crystal magnetic anisotropy selected from the group consisting of yttrium, cerium, praseodymium, neodymium, samarium, gadolinium and misch metal which is a mixture of various rare earth metals.

7. A ferromagnetic resin composition according to claim 3, wherein the rare earth-cobalt powder is of $A\text{-}Co_5$ or $A_2\text{-}Co_{17}$, wherein A is a rare earth element showing crystal magnetic anisotropy selected from the group consisting of yttrium, cerium, praseodymium, neodymium, samarium, gadolinium and misch metal which is a mixture of various rare earth metals.

8. A ferromagnetic resin composition according to claim 4, wherein the rare earth-cobalt powder is of $A\text{-}Co_5$ or $A_2\text{-}Co_{17}$, wherein A is rare earth element showing crystal magnetic anisotropy selected from the group consisting of yttrium, cerium, praseodymium, neodymium, samarium, gadolinium and misch metal which is a mixture of various rare earth metals.

9. A ferromagnetic resin composition according to claim 1, wherein said thermosetting resin or thermoplastic resin coated on the surface of said magnetic powder is present in an amount of 0.5–2% by weight.

10. A ferromagnetic resin composition according to claim 2, wherein said thermosetting resin or thermoplastic resin coated on the surface of said magnetic power is present in an amount of 0.5–2% by weight.

11. A ferromagnetic resin composition according to claim 5, wherein said thermosetting resin or thermoplastic resin coated on the surface of said magnetic powder is present in an amount of 0.5–2% by weight.

12. A ferromagnetic resin composition according to claim 1, wherein said magnetic powder is further coated with 0.1–2% by weight of an organosilane.

13. A ferromagnetic resin composition according to claim 12, wherein said organosilane is an epoxy silane, an amino silane, a vinyl silane or a chloro silane.

14. A ferromagnetic resin composition according to claim 5, wherein said magnetic powder is further coated with 0.1–2% by weight of an organosilane.

15. A composition according to claim 1 in the form of a molded magnet having a magnetic force in terms of $(BH)_{max}$ of 2–15 MGOe, wherein said composition has been molded in a magnetic field.

16. A composition according to claim 10 in the form of a molded magnet having a magnetic force in terms of $(BH)_{max}$ of 2–15 MGOe, wherein said composition has been molded in a magnetic field.

17. A composition according to claim 14 in the form of a molded magnet having a magnetic force in terms of $(BH)_{max}$ of 2–15 MGOe, wherein said composition has been molded in a magnetic field.

18. A ferromagnetic resin composition according to claim 1, wherein the resin for coating is applied as a solution.

* * * * *